(12) United States Patent
Kennedy

(10) Patent No.: US 7,887,763 B2
(45) Date of Patent: *Feb. 15, 2011

(54) APPARATUS FOR CHEMICAL OR BIOLOGICAL REACTIONS

(76) Inventor: Roger Kennedy, 152 Bury New Road, Whitefield, Manchester (GB) M45 6AD ( * ) Notice: Subject to any disclaimer, the term of this patent is extended or adjusted under 35 U.S.C. 154(b) by 949 days.

This patent is subject to a terminal disclaimer.

(21) Appl. No.: 10/583,922

(22) PCT Filed: Dec. 23, 2004

(86) PCT No.: PCT/GB2004/005391
§ 371 (c)(1),
(2), (4) Date: Jun. 20, 2006

(87) PCT Pub. No.: WO2005/061091
PCT Pub. Date: Jul. 7, 2005

(65) Prior Publication Data
US 2007/0110646 A1    May 17, 2007

(30) Foreign Application Priority Data

Dec. 24, 2003  (GB) .................................. 0329935.1
Jan. 19, 2004  (GB) .................................. 0401069.0

(51) Int. Cl.
*B01J 4/00*     (2006.01)
*B01J 19/00*    (2006.01)
(52) U.S. Cl. ...................... 422/220; 422/225; 422/228; 422/229; 435/289.1
(58) Field of Classification Search ................ 422/220, 422/225, 228, 229; 435/289.1
See application file for complete search history.

(56) References Cited

U.S. PATENT DOCUMENTS

| | | | | |
|---|---|---|---|---|
| 2,703,304 | A * | 3/1955 | Paladino | 435/43 |
| 5,660,467 | A * | 8/1997 | Mineo et al. | 366/279 |
| 7,171,959 | B2 * | 2/2007 | Kennedy | 123/592 |
| 7,409,948 | B2 * | 8/2008 | Kennedy | 123/590 |
| 7,451,752 | B2 * | 11/2008 | Kennedy | 123/592 |
| 2009/0107444 | A1 * | 4/2009 | Kennedy | 123/184.53 |

FOREIGN PATENT DOCUMENTS

| | | |
|---|---|---|
| DE | 39 02 162 | 8/1990 |
| DE | 298 19 778 | 4/2000 |
| EP | 0 027 911 | 5/1981 |
| EP | 0 614 866 | 9/1994 |
| EP | 1 101 526 | 5/2001 |
| GB | 525686 | 9/1940 |
| GB | 2 278 674 | 12/1994 |

* cited by examiner

*Primary Examiner*—Jennifer A Leung
(74) *Attorney, Agent, or Firm*—Gerald E. Hespos; Michael J. Porco

(57) ABSTRACT

The present invention relates to an apparatus for use in conducting chemical or biological reactions requiring the input of at least one fluid reagent and/or the output of at least one fluid product, the apparatus comprising a reaction chamber having an inlet for the supply of at least one reactant and an outlet for the recovery of at least one product, the reaction chamber being provided with a regulator comprising a propeller mounted in the reaction chamber in the region of the inlet for dispersing the at least one reactant in the reaction chamber.

11 Claims, 4 Drawing Sheets

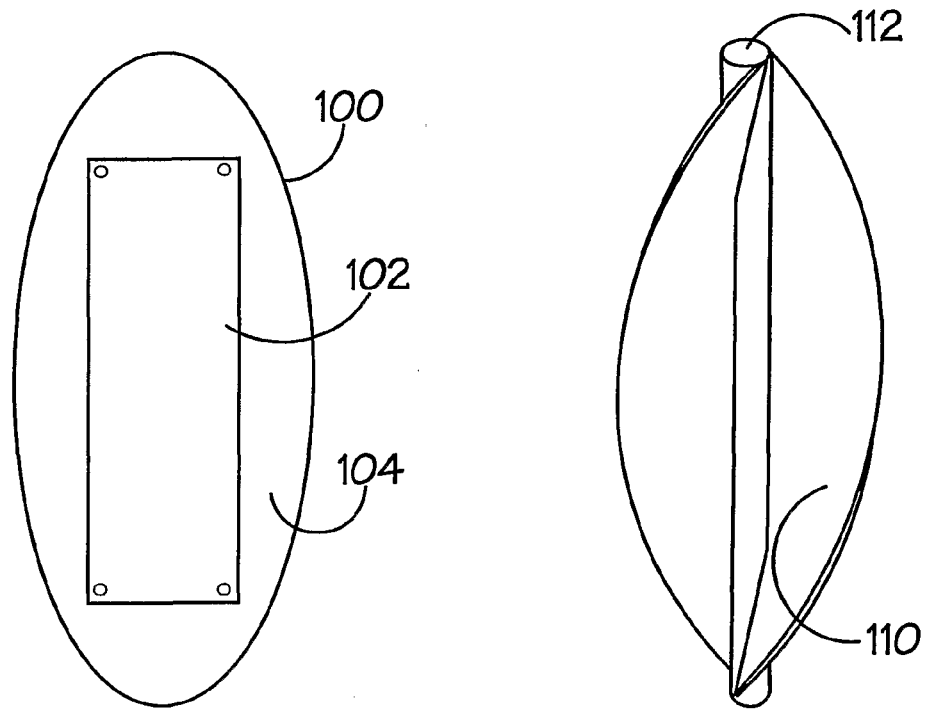
FIG.5.  FIG.6.
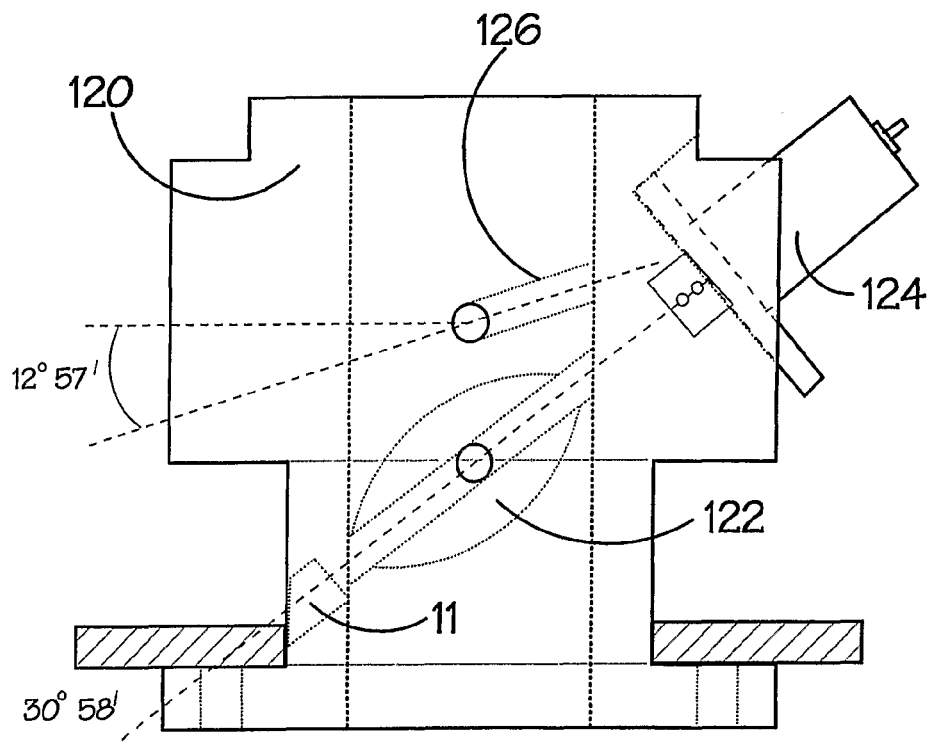
FIG.7.

APPARATUS FOR CHEMICAL OR BIOLOGICAL REACTIONS

The present invention relates to an apparatus for use in conducting chemical or biological reactions involving the input of fluid reagents and/or the production of fluid products.

Standard chemical and biological reactors are often used for a number of different reactions types and are often constructed for general applications. Many reactors for commercial use have been developed in order to increase efficiency and assist in high throughput of reagents to produce the required product. Standardized reactors are often more than adequate for applications whereby a reaction takes place in a purely liquid phase. However a number of chemical biological reactions require the input of fluid materials such as gaseous reagents into a reactor in order that a suitable reaction can occur. The resultant product or products from the reaction may also result in a fluid material which may be in a gaseous state. Standardized reactor vessels are not appropriate for some reactions as more specialist reactor vessels may be required due to the extra pressure constraints on the vessel etc.

There is therefore a need for a reactor vessel which can be used to mix a number of reagents together and allow at least one reagent to be in a substantially fluid form, it would also be advantageous for such a vessel to allow for the addition of a fluid material reagent that easily disassociates with other fluid material reagents or recondenses easily should it be vaporized or atomized prior to entry to the vessel. When such a fluid material reagent disassociates or recondenses, it can lead to an inefficient reaction in addition to leaving residues on certain parts of the reaction vessel which will require post reaction cleaning etc. Furthermore, an inefficient reaction vessel may also lead to impurities in the final product and waste gases and exhaust fumes from the reactor vessel may also have high concentrations of reagent which may be potentially dangerous. Indeed, a reaction vessel often requires expensive modifications or additional apparatus in order to further process waste fluid materials/exhaust fumes from a reactor should it be dangerous and/or laden with particulate matter which cannot be immediately expelled into the environment.

It is an object of the present invention to provide an apparatus for conducting chemical or biological reactions which is capable of processing one or more fluid reagents and/or expelling one or more fluid products. It is also an object of the present invention in order to provide an apparatus which alleviates one or more of the above identified problems associated with the prior art reactors.

In accordance with the present invention there is provided an apparatus for use in conducting chemical or biological reactions requiring the input of at least one fluid reagent and/or the output of at least one fluid product, the apparatus comprising a reaction chamber having an inlet for the supply of at least one reactant and an outlet for the recovery of at least one product, the reaction chamber being provided with a regulator comprising a propeller mounted in the reaction chamber in the region of the inlet for dispersing the at least one reactant in the reaction chamber. The present invention therefore provides an apparatus which can accommodate a reagent comprising a fluid material (preferably in a substantially gaseous phase), and may also include reagents which may disassociate from one another quickly whilst in a fluid form and also those reagents which may recondense having previously been vaporized or atomized before entry into the inlet. Equally, the apparatus can also accommodate fluid material which emanates from the reactor and/or exhaust gases which may be produced as a by product of the reaction process.

The perforated element may be operable between a first closed position arranged to allow passage of the fluid through the perforations, and a second open position arranged to allow the passage of the fluid by passing the perforations. Preferably, there are at least two perforated elements. A first perforated element may be disposed in a region upstream of the propeller and a second perforated element may be disposed in a region downstream of propeller. The perforated element and/or propeller may be heated by a heating means and such a heating means may be connected directly to the perforated element or propeller or alternatively may be connected indirectly. For example, should the heating means be connected directly, the perforated element may have heating elements embedded within it or indeed the perforated element may act as a heating element in itself upon the application of an electrical current. Similarly, the propeller may have heating elements embedded or disposed on or in the propeller and again an electrical current may be applied in order to heat the propeller. Should either the perforated element or the propeller be heated indirectly, this may be by means of heat transduction or conduction through elements which can conduct heat or from the heating element located up stream of an inlet or outlet. Preferably, the means for heating comprises an electrical power supply and/or thermal conduction. Additionally, the heating means may be a heating coil disposed either externally or internally to the inlet or outlet. Commonly, an inlet or outlet will be a tube or similar structure. The perforated element and propeller may have dimensions which conform substantially to the dimensions of the inlet or outlet tube or alternatively may be slightly smaller and may have means for fixing both the propeller and the perforated element to the inlet or outlet.

The propeller and/or the perforated element will preferably be manufactured from a material that is substantially inert under a range of chemical and physical variables. For example, the propeller and/or perforated element may be pre-treated with a coating for protection from acids, alkalis, oxidizers and solvents. The coatings may also assist in these parts being capable of resisting high temperatures, abrasion and vacuum conditions etc. Materials that may also be used can include alloys and composite materials and ceramics and other materials and coatings will also be apparent to one skilled in the art of chemical and biological reactors.

The perforated element may additionally be rotatable about a shaft and such a rotation may or may not be in conjunction with the propeller. The rotation of the perforated element may be in an opposing direction to that of the propeller or alternatively it may rotate in the same direction. The rotation of propeller may have similar or differing speed as the perforated element and may be connected to a power supply for driving the propeller. The apparatus may further comprise a means for mounting the at least one perforated element and the propeller in the manifold, and the propeller may have a longitudinal shaft defining a rotation axis and at least one blade attached to the shaft by means of an elongated blade root which substantially follows the longitudinal axis of the shaft. The propeller may comprise a plurality of blades in a number of shapes and preferably, the shape will be substantially that of a semi-circle, a tear drop, a half tear drop, a bellcurve, a half bellcurve, a rectangle, a triangle and variations thereof. The precise shape and configuration of the blades will be determined by factors such as flow rates and the position of the propeller relative to the inlet and/or outlet. The heat and/or speed of the propeller and/or perforated element may be controlled by an electronic control unit (ECU). It will be evident to one skilled in the art, that such an ECU can be used in order to control the reaction process in the reaction vessel and may be capable of assimilating information from sensors which can be disposed at one or more positions throughout the apparatus. Such an ECU will commonly be used in conjunction with a user interface such as a computer in order that results of the reaction process and control of the reaction process can be easily administered. The propeller may be produced from a composite of a heat conductive material and a non-heat conductive material. The axis of the propeller may be substantially in alignment with the longitudinal axis of the inlet or outlet but may alternatively be at an angle of 0.5° to 60° with respect to the longitudinal axis of the inlet or outlet. Preferably, the angle of the propeller is between 10° and 45°. The perforated element may comprise a gauze and the exact size gauze and material used will be dependent upon the exact chemical or biological reaction. Preferably, the perforated element is aligned perpendicular to the longitudinal axis of the inlet or outlet, but alternatively the perforated element may be disposed at an angle to the inlet or outlet wall in the range of 1° to 25°. More preferably, the perforated element is disposed at an angle of in the range of 5° to 20°.

The fluid reagent used in the apparatus may comprise two reagents which quickly disassociate from one another and therefore after the initial mixing prior to insertion of the mixture into the inlet, the propeller and perforated element arrangement helps to ensure that the two reagents are maintained in a homogeneous mixture. The fluid reagent may also comprise at least one reagent which reverts to a solid or liquid state and may comprise only one reagent in certain reactions. Preferably, the reagent is converted into a substantially gaseous state by atomization or vaporization. The substantially gaseous product may comprise exhaust gases from the reaction but may also have a gaseous product mixed with a waste product which requires further processing.

Another advantage of the regulator according to the present invention is that it may serve to reduce, inhibit or prevent the deposition of reagent materials or contaminants on the inside surface of the inlet and/or outlet.

The regulator of the apparatus when located in the outlet may further comprise a portion which is charged so as to attract and collect particulate matter from the liquid product. Such a portion may be charged by means of two electrodes which are able to attract charged particles. The regulator may further comprise a filter to collect the particulate matter and a suction means may be attached to the filter in order to attract additional particulate matter to the filter. Yet an additional portion may also be provided in the regulator for liquefying gaseous material should it be present in the product and again a suction means may be attached to the portion in order to attract the gaseous material to be liquefied therein. The liquefying portion may liquefy material by a number of means but will commonly employ a cooling fluid or path cooled by a cooling fluid such as liquid nitrogen in order to achieve its goal.

The apparatus may be used to produce a number of chemical or biological reactors and can be adapted into a number of designs including bubble column, airlift, flocculated bed, fluidized or atomized bed, packed bed, and stirred tank. For example, the apparatus may be used to produce a flocculated cell reactors commonly used in wastewater treatment. In fluidized bed reactors, cells are "immobilized" small particles, which move with the fluid. The small particles create a large surface area for cells to stick to and enable a high rate of transfer of oxygen and nutrients to the cells. In packed bed reactors, cells are immobilized on large particles. These particles do not move with the liquid. Packed bed reactors are simple to construct and operate but can suffer from blockages and from poor oxygen transfer. Stirred tank reactors use mechanical stirrers (impellers) to mix the reactor to distribute heat and materials (such as oxygen and substrates).

Furthermore, the apparatus may be used in reactors of varying sizes and flow rates and the apparatus adapted to accommodate such changes in dimensions, for example by employing differently shaped propeller blades. In order that optimization of conditions for a number of reaction types within the apparatus can be permitted, the apparatus may allow for a number of adjustments to be made, such as the angle of the propeller and/or the perforated element. Variables such as as fluid flow (laminar or turbulent including density, viscosity, velocity, pressure and elevation), heat-transfer (conduction and/or convection including density, thermal conductivity, viscosity, heat-transfer coefficient, temperature and velocity), mass-transfer (diffusion and/or convection including diffusion coefficient, mass-transfer coefficient, species concentration, velocity and viscosity), in addition to reaction rate constants, reactant conversion, species concentrations, temperature, reactor volume and feed rate may all be adjustable for example.

It will be apparent to one skilled in the art that a chamber may comprise a number of vessels which are connected to one another, or alternatively or additionally, a number of chambers may be connected to, one another. In such an arrangement, the connectors may be considered as "inlets" or "outlets" and therefore a propeller and/or perforated element may be located within the connectors.

Accordingly, the invention provides an induction regulator for a chemical or biological reactor, the regulator comprising a propeller and means for mounting the propeller adjacent an inlet port of the reactor for regulating the dispersion of gaseous materials supplied to the reactor.

The regulator according to the invention may be provided with a multiplicity (e.g. 2, 3, 4 or more) propellers in the inlet and/or outlet. These may be mounted side by side, or staggered, or may be mounted in series beneath each other. Combinations of these arrangements are also contemplated. In inlets and/or outlets with multiple branches, one or more propellers may be provided in more than one or in each of the branch.

The invention further provides a method for conducting a chemical or biological reaction comprising supplying a number of gaseous reagents to a reaction chamber and dispersing those reagents in the chamber by means of a driven propeller mounted in the chamber.

The invention also provides a chemical or biological reactor comprising a reaction chamber having at least one inlet for the supply of a gaseous reactant material, and a driven propeller mounted in the region of the inlet for regulating the distribution of the gaseous reactant material in the reaction chamber.

The invention also provides a chemical or biological reactor comprising a reaction chamber having at least one inlet for the supply of a gaseous reactant material, and a driven propeller mounted downstream of the inlet in the reactant flow path for regulating the distribution of the gaseous reactant material in the reaction chamber.

The invention also provides a chemical or biological reactor comprising a reaction chamber having at least one inlet for the supply of a gaseous reactant material, and a driven propeller mounted immediately downstream of the inlet in the reactant flow path for regulating the distribution of the gaseous reactant material in the reaction chamber.

A specific embodiment of the present invention will now be described by way of example only, with reference to the accompanying figures:

FIG. 5 is a plan view of a propeller as used in a regulator in accordance with the present invention;

FIG. 6 is an embodiment of a propeller as used in a regulator in accordance with the present invention;

FIG. 7 shows a schematic diagram of a propeller and perforated element forming a regulator located in an inlet in accordance with the present invention;

Figure 1:
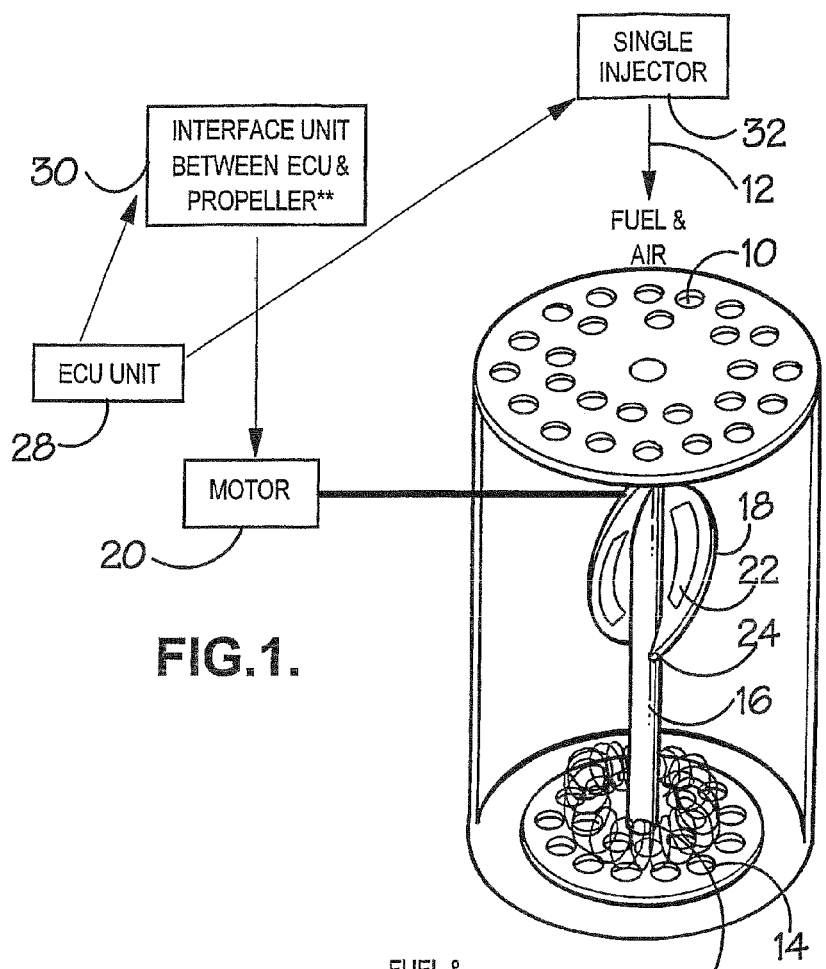
FIG. 1 shows a regulator with one propeller and two perforated elements in accordance with the present invention.

With reference to FIG. 1, there is provided a regulator for placement in an inlet of a chemical reactor comprising a first perforated element 10 located towards the fluid reagent supply 12 (located upstream) and a second perforated element 14 located towards the reaction chamber (located downstream). The regulator also has a shaft 16 to which a propeller 18 is attached and which is capable of rotating via a motor 20. The propeller 18 has two metallic strips located thereon which are capable of either being used as heating elements or capable of heat transduction so as to warm the fluid reagent(s) 12 and air mixture if required. The propeller 18 is also made from a resin material 24 to which the metallic strips 22 are adhered to or impregnated. The second perforated element 14 may be capable of rotation via motor 20 and also comprises a heating coil 26 which can again be used to heat the gaseous reagent 12. The rotation of the shaft 16 and heating of the metallic strip 22 and coil 26 is controlled by an electronic control unit 28 which can be configured by an interface unit 30. The ECU unit 28 can also vary the rotation of the shaft 16 in accordance to parameters received by an indicator 32 which relays data regarding the conditions of the reaction back to the ECU.

Figure 2:
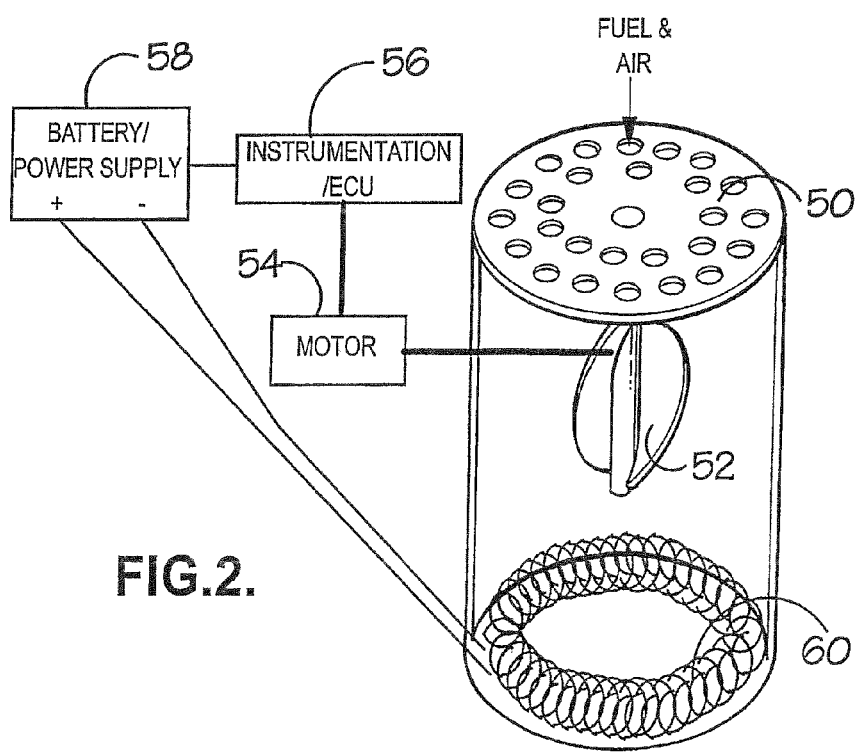
FIG. 2 is a diagram of a regulator in accordance with the present invention comprising a propeller, a perforated element and a heating coil.

With reference to FIG. 2, there is provided a regulator with one perforated element 50 and a propeller 52 made out of an appropriate material. The motor 54 powers the propeller 52 via an instrumentation or electronic control unit 56. Power to rotate the propeller 52 is provided by a battery/power supply (such as AC/DC current) 58 and a heating coil 60 is also provided in order to warm the fluid reagent in order to assist atomization and/or vaporization.

Figure 3:
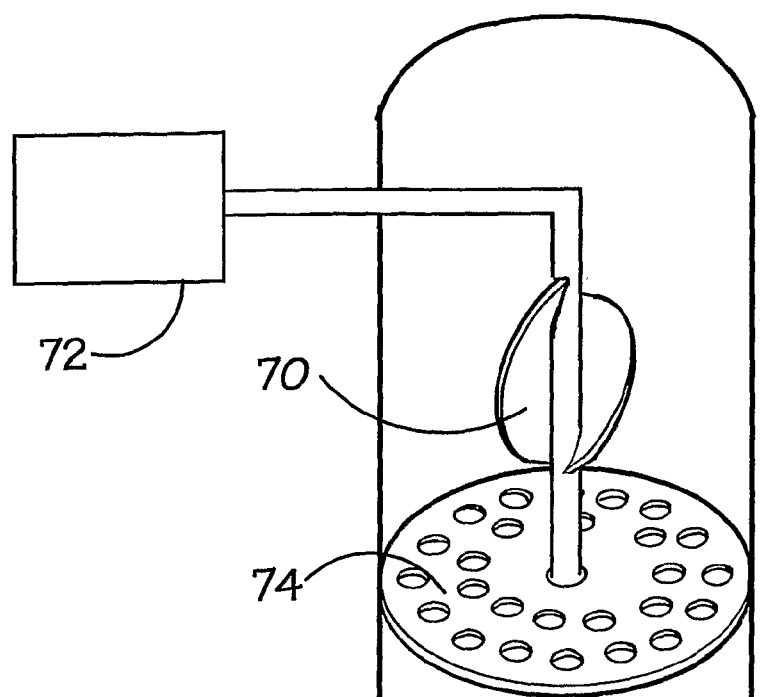
FIG. 3 is a diagram of a regulator in accordance with the present invention having one propeller and two perforated elements.

With reference to FIG. 3, there is provided a regulator with a propeller 70 powered by a motor 72. Two perforated elements 74 are found towards the reaction chamber end of the inlet and therefore the gaseous reagents are mixed by the propeller 70 prior to penetrating both perforated elements 74.

Figure 4:
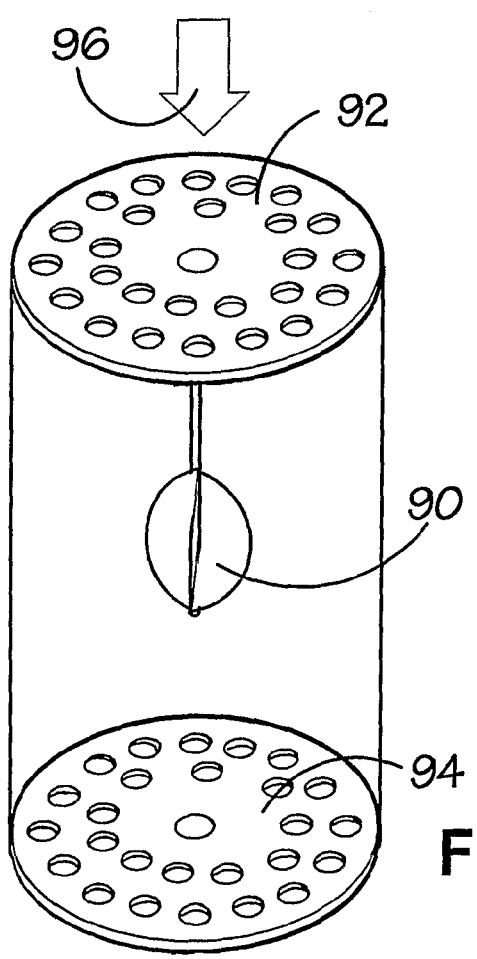
FIG. 4 is a diagram of a regulator in accordance with the present invention having a propeller and two perforated elements.

With reference to FIG. 4, there is provided a regulator with a propeller 90 disposed between a first perforated element 92 and a second perforated element 94. An injector 96 injects the gaseous reagent into the inlet and this reagent is either atomized or vaporized prior to penetrating the first perforated element 92 and reaching the propeller 90 and then penetrating perforated element 94 prior to reaching the reaction chamber.

With reference to FIG. 5, there is provided a propeller blade 100 which comprises a heat/electric current conducting strip 102 which is either bonded onto a resin blade 104 or impregnated in the resin blade 104. The metallic strip 102 may act as a heating means by transferring heat from other parts of the regulator to the gaseous reagent or alternatively may be used as a heating element itself by connecting it to a power source such as a mains supply or a battery supply.

With reference to FIG. 6 there is provided a propeller blade 110 of a elliptical shape produced wholly from a heat transducing material or a resin material capable of withstanding exposure to reagents and products of a number of reactions. A number of materials can be employed in the manufacture of the blades, but commonly they will be of an inert material. The blade has a spindle 112 through which a shaft can be placed and the propeller rotated.

With reference to FIG. 7, there is provided a regulator placed inside an inlet 120 whereby the propeller 122 is positioned at an angle of approximately 30° in the inlet tube and has a motor 124 which powers the propeller 122 if appropriate. A perforated element 126 is disposed at an angle of 12° in the tube that forms the inlet of the reaction apparatus.

Figure 8:
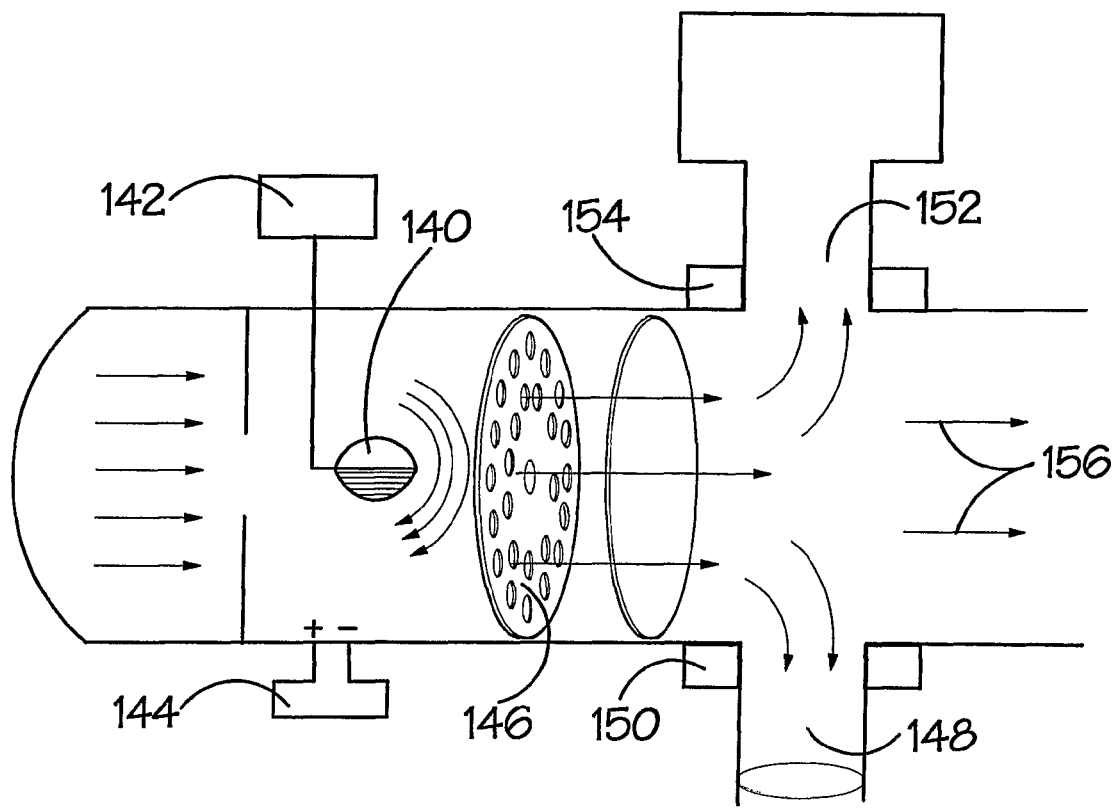
FIG. 8 is a diagram of a regulator in accordance with the present invention used in an outlet.

With reference to FIG. 8, there is provided a regulator for use in an outlet comprising a propeller 140 which is rotatable via a motor 142. A portion of the regulator has a charging unit 144 capable of charging the fluid material (such as emitted gas) from the reaction chamber in order to attract heavy particles. The charging device also has a collection part which is capable of storing particles of which have been attracted by the charging unit 144. A perforated element 146 is also provided which is heated and thus can burn excess gaseous material if required. The fluid material (including exhaust gases) can then pass to a filter 148 which has a suction pump 150 attached in order to filter particulate matter from the exhaust gases. Furthermore, liquefying device 152 is also provided again with a suction pump 154 for liquefying certain gases should it be required in order to reduce the emissions of the exhaust or indeed to refine the product of the reaction. The resultant fluid material gases 156 can then either continue into a further processing device such as a catalytic reactor or out into the environment depending on the reaction being conducted. The device attached to the outlet can be placed either before or after the catalytic reactor should one be fitted to the reactor.

When the regulator is used in conjunction with an inlet, it will be most commonly controlled by an electronic control unit 28 which can be programmed by a interface unit 30 which ultimately controls the motor 20, 54 and 72. Therefore the rotation of the propeller 18, 52, 70, 90, 100, 110 will be dictated by engine speed and engine load in addition to a number of other variables. The ECU 28 will also determine the correct rotation after assessing information and in conjunction with use of an injector 32, 96 or vaporizer (or similar device) if fitted. A number of differently shaped propellers 18, 52, 70, 90, 100, 110, 122 can be used and most commonly it will be in the form of an elliptical shape, a teardrop shape a bell shape or variations thereof. The propeller 18, 100, can be used as a heating element in order to heat the gaseous reagent when in the regulator and this can be via metallic strips 22, 102 which act as heating elements or act to dissipate the heat throughout the regulator. The ECU unit 28 also controls the speed by which a perforated disc 10, 14, 50, 74, 92, 94, 126 can rotate. The ECU can also control the heating of the element and such an element may in itself be used as a heating element or have a heating element embedded therein. Alternatively, a separate heating element 26 or 60 can be placed in the regulator and this may or may not be connected near to a perforated element as show in FIG. 1. The propeller 18, 52, 70, 90, 100, 110 and 102 can be angled depending on the size and the curvature of the inlet and indeed can be angled relative to the axis of the inlet or outlet tube depending on the application. The propeller can be placed in any position in the inlet or outlet such that it is located in between the two perforated elements, before a perforated elements, after a perforated element and indeed next to or adjacent to an injector or vaporizer.

The action of the rotating propeller and/or perforated element which can be heated and can provide for a homogenous mixture of reagents for use in the reaction chamber (not shown). Additionally, should the regulator be used in an outlet, it will greatly aid removal of products and waste materials and may also assist in re-vaporizing condensed gaseous material etc. Therefore, the combination of the propeller and the perforated element greatly improves efficiency. Any crevice in the inlet which stores unutilised reagent can be cleaned by the gas pressure the propeller creates a pressure on the reaction chamber as the pressure builds up in the inlet, helping to remove unutilised reagent and thus cleaning the inlet. The propeller also helps to increase the efficiency of the reactor as turbulence is increased in the reagent prior to entering the reaction chamber. The provision of heating the perforated element assists in mixing of the gaseous reagent and the elevated temperatures also assist in the reactor starting from cold should the reactor take time to "heat up" and reach its maximum efficiency.

The propeller need not be used continuously and can be turned on and off according to when a reagent enters the inlet and may be used in conjunction with the perforated element as this will greatly reduce the energy consumption of the regulator and therefore be more efficient. The reactor may be used in a continuous or butch wise manner.

The propeller may be of a number of configurations but will commonly comprise 3 to 10 blades. The perforated element can be a mesh or similar device and it's mesh size will be dependent upon a given reaction.

With regard to the regulator being used in the outlet, the main principles regarding the workings of the regulator remain similar to the working of the regulator in an outlet, whereby the propeller 140 and the motor 142 can be controlled by an electronic control unit, as does the operation of the perforated filter 146. The perforated filter can be capable of adjustment at any angle or indeed rotated in unison or separately from the propeller 140. Additionally, there is provided a charging device 144 which is electrically charged with two electrodes which when activated can attract large particles from the product or exhaust gas emissions from the reaction (or mixture of both) and stored for future disposal or removal. Furthermore, a particulate bag 148 can also be used in conjunction with a suction pump 150 in order to remove further particulate matter via employing a similar device to that of a vacuum cleaner wherein a suction is made to an area (part of the outlet) which can store and attract particulate matter which is not being collected by the charging device. Additionally, a liquefying device 152 again employing a suction pump 154 can also be used in order to liquefy gases should it be required. Such a device may be used if the product is in a gaseous form and can be isolated by this method. Alternatively, the device can be used to freeze certain gaseous compounds which may be potentially dangerous to the environment. The exact means by which the device liquefies gas may be by means of liquid nitrogen or a similar cooling agent.

It will be evident that a reagent may comprise one or more reagents which are mixed together. Alternatively, a reagent(s) may be mixed with air or an inert carrier for the purposes of the reaction.

The regulator for use in either the inlet or the outlet can be installed as an integral part of the manufacture of the or indeed the chemical or biological reactor. However, they may also retro-fitted to existing reactors. In either case, the regulators can be manufactured as single sealed, units to facilitate easy installation.

The invention claimed is:

1. An apparatus for use in conducting chemical or biological reactions requiring the input of at least one fluid reagent and/or the output of at least one fluid product, the apparatus comprising a reaction chamber having an inlet for the supply of at least one reactant and an outlet for the recovery of at least one product, the reaction chamber being provided with a regulator comprising a propeller mounted in the inlet for dispersing the at least one reactant in the reaction chamber, wherein the propeller has a longitudinal shaft defining a rotation axis and at least one blade attached to the shaft by means of an elongated blade root, the propeller being tilted at an angle of from between 0.5° to 60° with respect to the longitudinal axis of the inlet.

2. An apparatus as claimed in claim 1, provided with at least one perforated element capable of allowing the passage of fluid material therethrough.

3. An apparatus according to claim 2, wherein the perforated element and/or the propeller is heated by a heating means.

4. An apparatus according to claim 3, wherein the propeller is connected to a power supply for driving the propeller.

5. An apparatus according to claim 1, wherein the propeller comprises a plurality of vanes in the shape of a semi-circle, an ellipse, a tear drop, a half tear drop, a bellcurve, a half bellcurve, a rectangle, a triangle and derivatives thereof.

6. An apparatus according to claim 2, wherein the propeller is mounted beneath the perforated element.

7. An apparatus according to claim 4, wherein the degree of heating and/or the speed is controllable by means of an electronic control unit associated with the apparatus.

8. An apparatus to regulate distribution of at least one fluid reagent and the output of at least one fluid product, the apparatus comprising a reaction chamber having an inlet for supply of the at least one fluid reagent and an outlet for recovery of the at least one fluid product, the reaction chamber being provided with a regulator comprising a propeller mounted in the inlet for the distribution of the at least one fluid reagent in the reaction chamber, the propeller having a longitudinal shaft defining a rotation axis and at least one blade attached to the shaft by an elongated blade root, the propeller being tilted at an angle of between 0.5° to 60° with respect to the axis of the inlet.

9. A process for conducting a chemical or biological reaction comprising the steps of providing the apparatus in accordance with claim 1 and supplying at least one fluid reagent to the reaction chamber via the inlet.

10. An apparatus for use in conducting chemical or biological reactions requiring the input of at least one fluid reagent and/or the output of at least one fluid product, the apparatus comprising a reaction chamber having an inlet for the supply of at least one reactant and an outlet for the recovery of at least one product, the reaction chamber being provided with a regulator comprising a propeller mounted in the outlet for dispersing the at least one reactant in the reaction chamber, wherein the propeller has a longitudinal shaft defining a rotation axis and at least one blade attached to the shaft by means of an elongated blade root, the propeller being tilted at an angle of from between 0.5° and 60° with respect to the longitudinal axis of the outlet.

11. An apparatus to regulate distribution of at least one fluid reagent and the output of at least one fluid product, the apparatus comprising a reaction chamber having an inlet for supply of the at least one fluid reagent and an outlet for recovery of the at least one fluid product, the reaction chamber being provided with a regulator comprising a propeller mounted in the outlet for the distribution of the at least one fluid reagent in the reaction chamber, the propeller having a longitudinal shaft defining a rotation axis and at least one blade attached to the shaft by an elongated blade root, the propeller being tilted at an angle of between 0.5° to 60° with respect to the axis of the outlet.

* * * * *